United States Patent [19]
Schiff et al.

[11] 3,785,270
[45] Jan. 15, 1974

[54] REFLEX CAMERA VIEW FINDER
[75] Inventors: Otto M. Schiff, Laguna Beach;
Vitolds Rikis, Costa Mesa, both of Calif.
[73] Assignee: Coleman Systems, Irvine, Calif.
[22] Filed: Aug. 9, 1972
[21] Appl. No.: 278,955

[52] U.S. Cl. .................................. 95/11 V, 95/42
[51] Int. Cl. ........................................ G03b 13/02
[58] Field of Search....................... 95/42, 11 V, 47, 95/49

[56] References Cited
UNITED STATES PATENTS
| | | | |
|---|---|---|---|
| 501,931 | 7/1893 | Garfield | 95/42 |
| 2,252,640 | 8/1941 | Nüchterlein | 95/42 |
| 361,673 | 4/1887 | Clark | 95/42 |
| 1,298,582 | 3/1919 | Shafer et al. | 95/42 |
| 2,854,907 | 10/1958 | Tieck | 95/42 X |
| 3,507,199 | 4/1970 | Sato | 95/42 |

Primary Examiner—Samuel S. Matthews
Assistant Examiner—E. M. Bero
Attorney—Jess M. Roberts

[57] ABSTRACT

A ground glass is the upper wall of a view finder chamber that is movable bodily between a lower view finding position and an upper picture taking position. The chamber has an opening to receive the light beam from the camera lens and a mirror fixedly mounted in the chamber reflects the light beam onto the upper ground glass of the chamber. The image is erected by a second fixed mirror outside the chamber. A power-actuated crank moves the chamber and a light shield in the chamber automatically covers the chamber opening at the upper picture taking position of the chamber.

8 Claims, 4 Drawing Figures

REFLEX CAMERA VIEW FINDER

BACKGROUND OF THE INVENTION

In a conventional single-lens reflex camera, a fully reflecting mirror is mounted for swinging movement between a viewing position intersecting the axis of the optical system and a second picture-taking position out of the way of the beam of light.

One disadvantage of such a prior art arrangement is that the viewing position of the mirror relative to the ground glass may change with the passage of time because of wear at the pivotal support of the mirror and wear in the mechanism for actuating the mirror, such wear resulting in backlash.

Another disadvantage is that the mirror is commonly subject to impact in swinging to its picture-taking position with its outer end moving at maximum velocity and especially so if it swings snugly against fixed structure to serve as a light-proof shield at its picture-taking position. Repeated impact shocks impair the mirror.

SUMMARY OF THE INVENTION

One object of the invention is to eliminate the above mentioned cause for change in the desired precise spatial relationship between the mirror and the ground glass at the view-finding position of the mirror. This object is achieved by making the mirror and the ground glass fixed parts of a rigid view finder assembly that is bodily movable between a viewing position and a picture-taking position, the whole of the mirror moving at the same velocity. Thus, a constant predetermined spatial relationship between the mirror and the ground glass is assured over a long service life.

A second object of the invention is to eliminate the possibility of deterioration of the mirror by impact shocks. To achieve this object, the viewer assembly is in the form of a movable view finder chamber and the mirror is at a protected location inside the chamber. The view finder chamber has an opening to receive the beam of light from the camera lens when the chamber is in its view finding position and a light shield inside the chamber automatically moves into position to cover the chamber opening at the picture-taking position of the chamber.

An important feature of the invention is the concept of employing a power-actuated crank that rotates 180° to move the view finder chamber between its two limit positions. It is contemplated that at each of the two limit positions of chamber the crank will be on a diameter of its orbit that is parallel with the path of travel of the chamber. By virtue of this arrangement, the movement of the view finder chamber is sinusoidal, the chamber being progressively accelerated to the midpoint of its travel and then being progressively decelerated to the end of its travel. Thus, both abrupt initial acceleration and abrupt final deceleration are avoided.

The features and advantages of the invention may be understood from the following detailed description together with the accompanying drawings.

BRIEF DESCRIPTION OF THE DRAWINGS

In the drawings, which are to be regarded as merely illustrative.

DESCRIPTION OF THE SELECTED EMBODIMENT OF THE INVENTION

Figure 1:
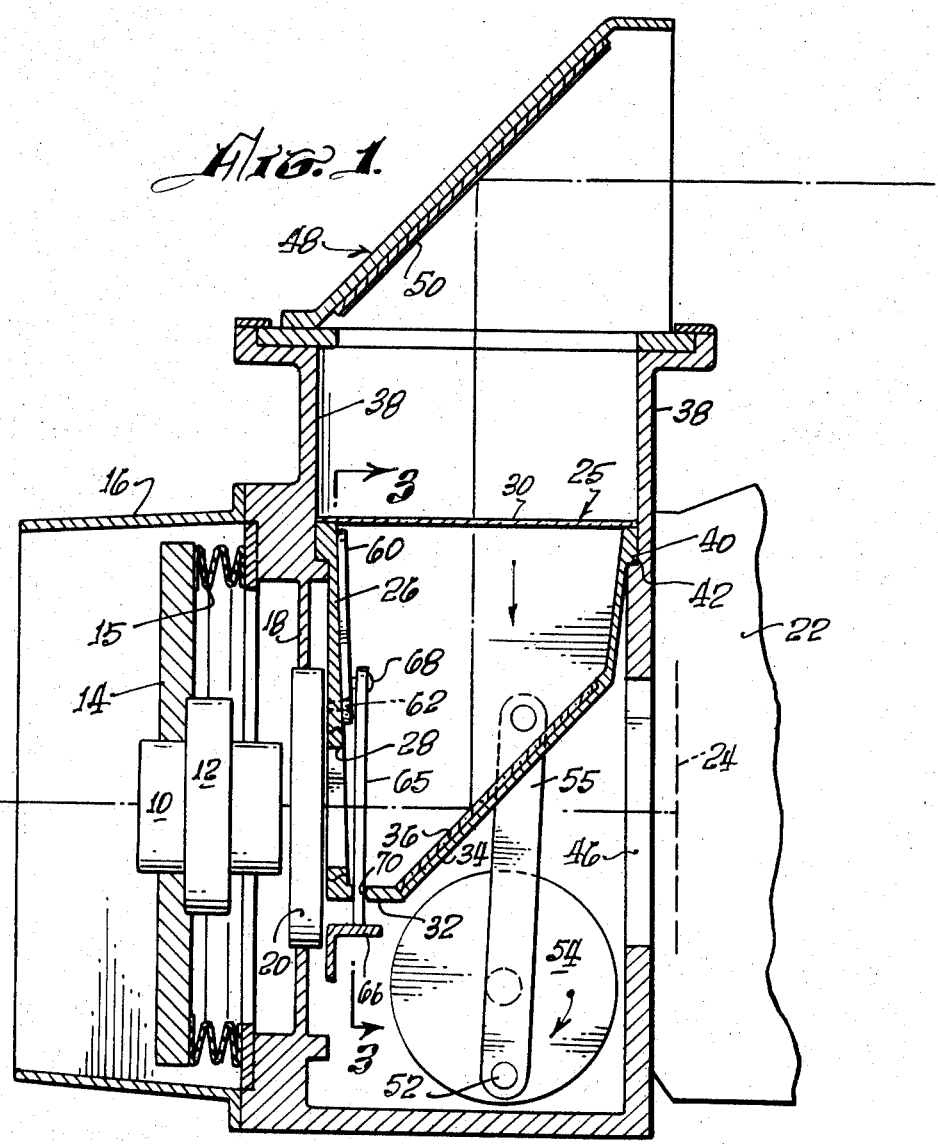
FIG. 1 is a sectional view of a single-lens reflex camera embodying the invention with the view finder chamber at its lower viewing position, the section being taken along the axis of the camera lens.

In the camera construction shown in the drawings, the lens barrel 10 of the camera equipped with an iris ring 12 is mounted on an upright lens board 14 at the front end of a bellows 15 inside a forward shroud 16. Mounted in the forward fixed wall 18 of the camera rearwardly of the range of movement of the lens barrel is a shutter assembly 20 for timing the exposure of film, the film (not shown) being in rearward film magazine 22 at a focal plane that is designated by a dotted line 24.

A view finder assembly in the form of a chamber 25 that characterizes the invention has forward wall 26 with a lower circular opening 28 therein to admit the beam of light from the camera lens and has a top wall in the form of a ground glass 30. The view finder chamber also has a short bottom wall 32 and an adjacent inclined wall 34 that supports an inclined mirror 36, the mirror being at an angle to reflect the light beam upwardly to create an image on the ground glass 30. The view finder chamber 25 is of rectangular plan configuration and is movable in a vertical guideway formed by four walls 38.

Figure 2:
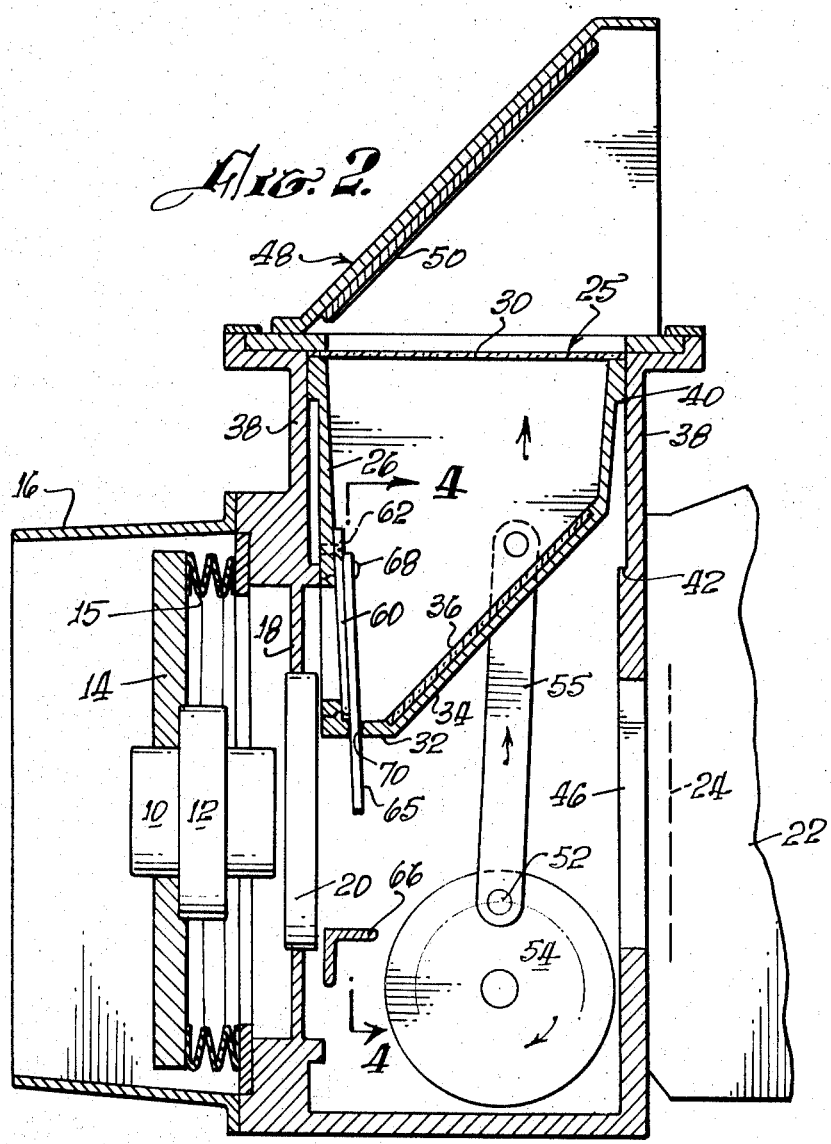
FIG. 2 is a view similar to FIG. 1 showing the view finder chamber elevated to the picture-taking position.

FIG. 1 shows the view finder chamber at its lower view finding position where a peripheral shoulder 40 at the upper end of the chamber abuts or is adjacent to a complementary inner peripheral shoulder 42 of the guideway. At this position of the view finding chamber, the opening 28 of the chamber is aligned with the camera lens to produce an image on the ground glass 30. When the view finder chamber 25 is elevated to the picture-taking position shown in FIG. 2, the chamber clears the light beam from the lens to permit the light beam to pass through a relatively large opening 44 in the rear wall 45 of the camera to project an image on the focal plane 24.

The image produced on the ground glass 30 when the view finder chamber is at its lower view finding position may be observed by the operator of the camera through a rear window 46 of an upper viewer hood, generally designated 48, which encloses a fixed inclined mirror 50 to erect the inverted image.

Various mechanisms may be employed in various practices of the invention to raise and lower the view finder chamber 25 between its two alternate positions. A feature of the present embodiment of the invention is the concept of employing a power-actuated crank 52 to raise and lower the chamber. The crank 52 is operated by a motor 54 that is positioned to one side of the rear wall opening 44. The crank 52 is operatively connected to the view finder chamber 25 by a suitable link 55, the lower end of which is pivotally mounted on the crank and the upper end of which is connected to the chamber by pivot means 56.

Various provisions may be made in various practices of the invention to cover the chamber opening 28 in a light-proof manner when the chamber is elevated to the picture-taking position. In the construction shown a light shield or mask 60 is mounted for this purpose on a pivot 62 on the inner face of the forward wall 26 of the view finder chamber. The light shield 60 is biased by gravity towards its lower closed position and preferably is additionally urged downward by a suitable leaf spring 64.

Figure 3:
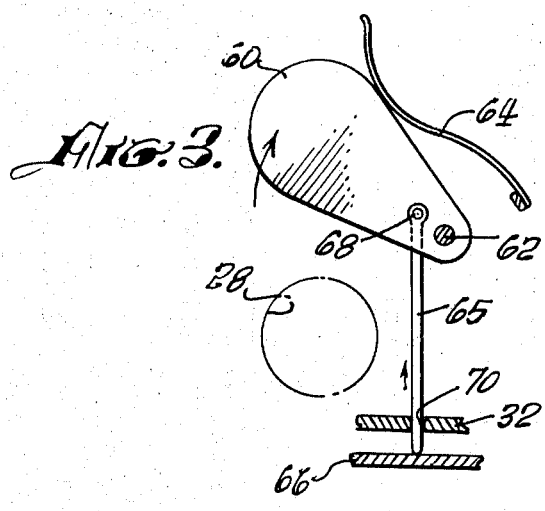
FIG. 3 is a section taken as indicated by the line 3—3 of FIG. 1 showing a light shield in the view finder chamber at its elevated open position.
Figure 4:
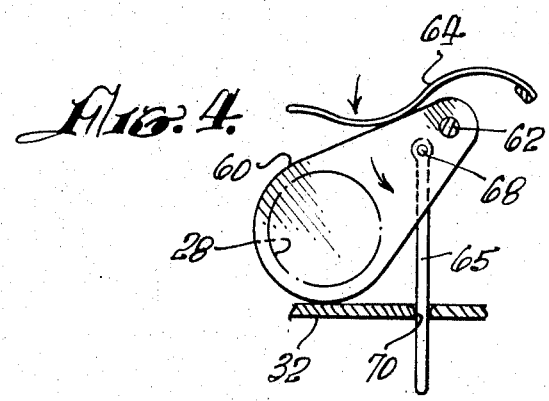
FIG. 4 is a view similar to FIG. 3 showing the light shield at its lower position closing the opening of the view finder chamber.

The light shield 60 is controlled by a downwardly extending rod 65 in cooperation with a fixed stop 66 that is spaced below the lowermost position of the view finder chamber. The upper end of the rod 65 is connected to the light shield 60 by a suitable pivot 68 and the lower end extends through a bore 70 in the bottom wall 32 of the view finder chamber. When the view finding chamber 25 is at its upper picture-taking position shown in FIG. 2, the light shield 60 is in its lower position shown in FIGS. 2 and 4 at which position it effectively covers the circular opening 28 of the view finder chamber in a light-proof manner. At this time the lower end of the rod 65 protrudes downwardly from the lower end of the view finder chamber as shown. When the view finder chamber 25 is shifted downwardly from the upper picture-taking position to its lower view finding position shown in FIG. 1, the downwardly advancing end of the rod 65 encounters the stop 66 with the consequence that the rod swings the light shield to its upper position shown in FIGS. 1 and 3 to uncover the opening 28 for the admission of the light beam from the camera lens.

Referring to FIG. 1, when the view finder chamber 25 is in its lower view finding position the crank pin 52 is on a diameter of its orbit that is parallel to the direction of travel of the view finder chamber and is at the lowest point on that diameter. When the view finder chamber is in the upper picture taking position the crank pin 52 is at the upper end of the same diameter. It is apparent, then, that the view finder chamber is moved sinusoidly in its opposite directions. Assuming that the motor 54 operates at a given rate, the view finder chamber 25 is progressively accelerated to maximum velocity at the midpoint in its range of movement and then it is progressively decelerated to the end of its movement. Thus, both the initial velocity and the terminal velocity of the view finder chamber are exceedingly low to avoid excessive stress in the mechanism.

All parts of the view finder chamber including all parts of the mirror 36 move in unison at the same velocity. Since there is no relative movement between the mirror 36 and the ground glass 30, the two being rigidly interconnected by fixed structure, there is no possibility of play or backlash developing over a long service life of the camera. All parts of the mirror 36 travel at the same velocity with the mirror fully protected from shock forces.

The view finder chamber 25 is of relatively light weight to minimize inertia and the shift of the chamber from its lower position to its upper picture-taking position can easily be accomplished in a short time period of approximately 250 milliseconds.

It is to be noted that both the motor 54 and the link 55 are out of the way. Both are positioned to one side of the view finder chamber and to one side of the opening 44 in the rear wall 45.

Our description in specific detail of the selected embodiment of the invention will suggest various changes, substitutions and other departures from our disclosure within the spirit and scope of the appended claims.

We claim:

1. In a reflex camera having an objective lens, a shutter and a view finding means including a ground glass and a mirror to intersect the light beam from the lens to reflect an image of the subject onto the ground glass, the improvement comprising:

a view finder chamber the mirror and ground glass being fixed parts of a view finder chamber, said chamber being movable between a view finding position at which the chamber intersects the beam of light from the lens to cause the mirror to reflect an image of the subject onto the ground glass and a picture-taking position at which the view finder chamber is clear of the beam of light, said chamber having an opening to admit the beam of light from the camera lens;

means to move the view finder chamber to its two positions alternately; and a light shield operative to cover said opening to prevent light from entering the camera through the view finder chamber when the chamber is in the picture-taking position, said light shield being movably mounted on the view finder chamber and being mechanically responsive to movement of the view finder chamber to uncover said opening when the chamber approaches the view finding position and to cover the opening when the chamber approaches the picture-taking position.

2. An improvement as set forth in claim 1
in which the camera has a fixed structure adjacent the view finder chamber;
and which includes cooperative means on the chamber and on the fixed structure respectively to move the light shield to its open position in response to approach of the chamber to its view finding position.

3. An improvement as set forth in claim 2 in which the light shield is spring-biased to seek its closed position when movement of the chamber out of its view finding position retracts the cooperative means on the chamber from said fixed structure.

4. An improvement as set forth in claim 3 in which said light shield is pivoted to move in its own plane between its two positions.

5. An improvement as set forth in claim 3 in which the light shield is pivotally mounted and in which the cooperative means on the view finder chamber is a rod pivotally connected to the light shield.

6. An improvement as set forth in claim 5 in which said rod extends through an aperture in the wall of the view finder chamber.

7. An improvement as set forth in claim 2
in which the cooperative means on the chamber extends to the exterior of the chamber in a position to encounter said fixed structure for actuation thereby to shift the light shield to its open position in response to approach of the chamber to its view finding position.

8. In a reflex camera having an objective lens, a shutter and view finding means including a ground glass and a mirror to intersect the light beam from the lens to reflect an image of the subject onto the ground glass, the improvement comprising:

a view finder assembly the mirror and ground glass being fixed parts of said view finder assembly for maintenance of constant spatial relationship between the mirror and the ground glass;

said view finder assembly being movable as a whole between a view finding position at which the assembly intersects the beam of light from the lens to cause the mirror to reflect an image of the subject onto the ground glass and a picture-taking position at which the view finder assembly is clear of the beam of light; and a power actuated crank movable between two opposite positions and operatively connected to the view finder assembly to move the view finder assembly between its two alternate positions;

the crank at each of its two opposite positions being on a diameter of the orbit of the crank that is parallel with the direction of travel of the view finder assembly whereby the movement of the assembly from each of its two alternate positions to the other position is sinusoidal with the assembly accelerating towards the midpoint of its travel and decelerating from the midpoint towards the end of its travel.

* * * * *